US008033557B2

(12) United States Patent
Dundon

(10) Patent No.: US 8,033,557 B2
(45) Date of Patent: Oct. 11, 2011

(54) VEHICLE SUSPENSION SYSTEM AND METHOD

(75) Inventor: Christopher Brian Dundon, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 523 days.

(21) Appl. No.: 11/539,973

(22) Filed: Oct. 10, 2006

(65) Prior Publication Data
US 2008/0084043 A1  Apr. 10, 2008

(51) Int. Cl.
*B60G 3/00* (2006.01)
(52) U.S. Cl. .............................. 280/124.134
(58) Field of Classification Search ........... 280/124.125, 280/124.134, 124.145
See application file for complete search history.

(56) References Cited

U.S. PATENT DOCUMENTS

| | | | |
|---|---|---|---|
| 3,027,175 A | | 3/1962 | Alexander |
| 4,415,178 A * | | 11/1983 | Hatsushi et al. ....... 280/124.145 |
| 4,570,968 A * | | 2/1986 | Mukai et al. .......... 280/124.145 |
| 4,720,120 A | | 1/1988 | Shimatani et al. |
| 4,793,629 A * | | 12/1988 | Konig et al. .......... 280/124.134 |
| 5,040,824 A * | | 8/1991 | Suss ...................... 280/124.134 |
| 5,094,474 A * | | 3/1992 | Ando et al. ........... 280/124.134 |
| 5,098,118 A * | | 3/1992 | Hayashi et al. ........ 280/124.134 |
| 5,556,119 A * | | 9/1996 | Buchner et al. ....... 280/124.134 |
| 5,938,220 A | | 8/1999 | Torneld |
| 6,003,897 A | | 12/1999 | Dostert et al. |
| 6,231,062 B1 * | | 5/2001 | Sutton .................... 280/124.146 |
| 6,446,991 B1 * | | 9/2002 | Klais ......................... 280/86.75 |
| 6,572,126 B2 | | 6/2003 | Tunzini |
| 6,705,627 B2 | | 3/2004 | Hasebe et al. |
| 6,749,360 B2 * | | 6/2004 | Abels ........................... 403/381 |
| 6,905,129 B2 * | | 6/2005 | Runte et al. ........... 280/124.134 |
| 7,293,787 B2 * | | 11/2007 | Nunez et al. .......... 280/124.134 |
| 2002/0000705 A1 * | | 1/2002 | Tunzini ................. 280/124.134 |
| 2002/0180171 A1 * | | 12/2002 | Hasebe et al. ......... 280/124.134 |
| 2003/0034625 A1 * | | 2/2003 | Runte et al. ........... 280/124.134 |
| 2004/0075234 A1 * | | 4/2004 | Seksaria et al. ....... 280/124.134 |
| 2004/0201196 A1 * | | 10/2004 | Katagiri et al. ....... 280/124.134 |
| 2005/0051987 A1 * | | 3/2005 | Saitoh et al. .......... 280/124.134 |
| 2005/0104315 A1 * | | 5/2005 | Howell et al. ......... 280/124.134 |
| 2005/0225049 A1 * | | 10/2005 | Michel et al. ......... 280/124.134 |
| 2006/0151970 A1 * | | 7/2006 | Kaminski et al. ..... 280/124.134 |
| 2006/0175786 A1 * | | 8/2006 | Streubel et al. ....... 280/124.134 |
| 2006/0220330 A1 * | | 10/2006 | Urquidi et al. ............. 280/5.516 |
| 2006/0290088 A1 * | | 12/2006 | Luttinen et al. ........... 280/93.51 |
| 2007/0120333 A1 * | | 5/2007 | Bushko ...................... 280/5.515 |

* cited by examiner

*Primary Examiner* — Paul N Dickson
*Assistant Examiner* — Barry Gooden, Jr.
(74) *Attorney, Agent, or Firm* — Kenealy Vaidya LLP; Mark E. Duell

(57) ABSTRACT

A vehicle suspension mounting structure and method can include a control arm connected to a bushing via a fastener rod and the method of connecting the same. The bushing can be attached to a portion of the vehicle frame. The fastener rod can be inserted into a cavity in the control arm such that the fastener rod extends away from the control arm and is prevented from being removed from the cavity in the control arm by a lip provided at a proximal end (relative to the control arm) of the fastener rod. The mounting structure and method can provide a safer and stronger connection between the control arm and bushing. In addition, serviceability can be improved and cost savings can be realized in some cases.

19 Claims, 4 Drawing Sheets

VEHICLE SUSPENSION SYSTEM AND METHOD

BACKGROUND

1. Field

The presently disclosed subject matter relates to a vehicle suspension system and a method of mounting a control arm of the suspension system to a vehicle frame. More particularly, the disclosed subject matter relates to a vehicle suspension system in which the control arm is attached by a fastening rod that extends from a cavity in the control arm and is connected via bushing to the vehicle frame. The rod can include a stopping structure configured to prevent the rod from passing completely through the cavity located on the control arm.

2. Brief Description of the Related Art

Typical vehicle suspension systems often require a great number of attachment mechanisms, and a great deal of space. The high number of components and their complex shapes also add cost and weight to a vehicle. In addition, the large volume required for these components also creates restrictions in vehicle design and also creates problems during repair in terms of added time required due to limited access to components, and added cost due to this added repair time and multiple part requirements. One area of concern is how each component is attached to the frame of a vehicle, particularly the suspension system components.

The vehicle suspension system connects the wheel mount structure with the vehicle frame. The suspension also controls a position of a tire with respect to the vehicle body for its ideal position during operation of the vehicle, and thus ensures optimal handling safety. It also prevents the wheel's axle/shaft from directly transmitting an impact or vibration from the road surface to the vehicle frame and in this way prevents damage of the vehicle cargo and improves the ride comfort for the vehicle passengers. Accordingly, the connection of the upper and lower portions of the vehicle's suspension system generally is made to be flexible to absorb the impact from the road surface, and to simultaneously moderate various forces applied to the vehicle's wheels.

Vehicle suspension systems typically include a complicated set of linkages, pneumatic devices, and springs that are designed to provide a smooth and relatively controlled ride for a vehicle. For example, a four bar linkage suspension can include lower and upper control arms connected on each side of the frame of a vehicle. The control arms are rotatably connected to the vehicle frame (e.g., by a "bar" type pivot/connecting device) so that they can rotate and move substantially vertically with respect to the vehicle frame. A knuckle typically connects each of the lower control arms to a respective upper control arm and a wheel mount structure can be attached to the knuckle. Thus, the wheel, when mounted, is permitted to move in a vertical direction relative to the vehicle frame.

The manner in which each of the components of a vehicle suspension system is connected to the frame of the vehicle and to each other has not typically been given a great deal of consideration other than to ensure proper functionality. For example, the control arms in a suspension system can be mounted in a variety of ways to the frame of a vehicle. The means of attachment can affect performance, safety, ease of serviceability and overall cost for a vehicle suspension system.

The control arms are specifically designed and positioned to allow the steering knuckles to move in a prescribed three-dimensional arc. Typically, the inner ends of the lower control arm have pressed-in bushings. Bolts, which pass through the bushings, serve to attach the lower arm to the vehicle frame. This is typically accomplished by pressing the bolt into the outer edge of the lower arm to simplify production of the parts. However, when an external force larger than a frictional force is applied to the bolt, the bolt can dislodge and retract from the same direction on the vehicle.

As shown in FIG. 5, a cross-sectional view of a conventional fastening mechanism can be provided where a fastener rod 25 is pressed in from the outer edge of a control arm 27 so that the fastener bolt shaft 28 is fed into the control arm cavity 29. This conventional fastening mechanism does not prevent the fastener bolt 25 from being dislodged and pulled out from the control arm 27. This method is typically used when the lower arm is made from a relatively lightweight material, such as aluminum, and it is thus necessary to use a bolt of relatively heavier weight material, such as steel, to connect to the bearing and vehicle frame. If the lower arm is made from a relatively heavy weight material, such as steel, a bolt may not even be necessarily used. For example, a rod like connection structure for connecting the lower control arm to the bushing and thus to the vehicle frame could be integrally formed with the steel lower control arm, or could be welded directly to the steel lower control arm.

Thus, other designs of mounting the lower arm exist wherein the fasteners are welded onto the arm or machined directly out of the arm material, integrating the arm and fastener into one piece. However, if the fastener is made from the same lightweight material as the lower arm, safety could be compromised, since the fastener undergoes a great deal of stress and is typically constructed from a relatively strong material. Typical mounting designs require heavyweight material for the connection between the lower control arm, bushing and vehicle frame.

Another example of a typical suspension system includes that disclosed in U.S. Pat. No. 5,938,220 (the '220 patent), which discloses a pivot bushing for a McPherson Type Suspension. The '220 patent describes a suspension arm of a three-point type. The suspension arm includes an outer anchoring point (for mounting of a lower bearing of a spring strut) and two inner anchoring points in the form of pivot means for pivotal mounting of the suspension arm to the vehicle body. The front pivot means is formed by a bushing extending essentially in the longitudinal direction of the vehicle and comprises a sleeve formed in the suspension arm. An elastic bushing element is inserted in the sleeve and is also shaped as a sleeve. The screw and bushing element and their guiding sleeve form an essentially conventional pivot means with the screw serving as a pivot axis.

There exists a need to provide a mount structure and method for mounting a lower control arm of a vehicle suspension system such that safety, cost-effectiveness, a ease of serviceability, are achieved.

SUMMARY

In accordance with an aspect of the disclosed subject matter, a vehicle suspension arm mounting arrangement can include a control arm, a bushing, and a fastening bolt having a stopping means, wherein the fastening bolt is mounted in a rear cavity of the lower control arm through the bushing, and wherein a threaded end of the fastening bolt protrudes from the rear cavity through the bushing, and a fastening nut secures the threaded end of the fastening bolt against the bushing.

In another aspect of the disclosed subject matter, the vehicle suspension arm mounting arrangement employs a stopping means formed as a fastening bolt lip.

In a further aspect of the disclosed subject matter, the vehicle suspension arm mounting arrangement can include a lower control arm and fastening bolt that are integrated into a single unit.

According to another aspect of the disclosed subject matter, the vehicle suspension arm mounting arrangement can include a lower control arm that is constructed of a material selected from a metal, a metal alloy, and a composite material. More specifically, the lower control arm material can be made from lightweight steel alloys, aluminum, aluminum alloys, composite resins, etc.

In another aspect of the disclosed subject matter, the fastening bolt is constructed of a material selected from a metal, a metal alloy, and a composite material. More specifically, the fastening bolt material can be made of steel, stainless steel, etc.

According to a further aspect of the disclosed subject matter, the vehicle suspension arm mounting arrangement can include a lower control arm, a bushing, and a fastening bolt having a lip, wherein the fastening bolt is mounted in a rear cavity of the lower control arm through the bushing, and wherein a threaded end of the fastening bolt protrudes from the rear cavity through the bushing, and the lip of the fastening bolt contacts an inner end of the rear cavity, and a fastening nut secures the threaded end of the fastening bolt against the bushing.

Still other features and attendant characteristics of the disclosed subject matter will become apparent to those skilled in the art from a reading of the following detailed description of embodiments, and taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
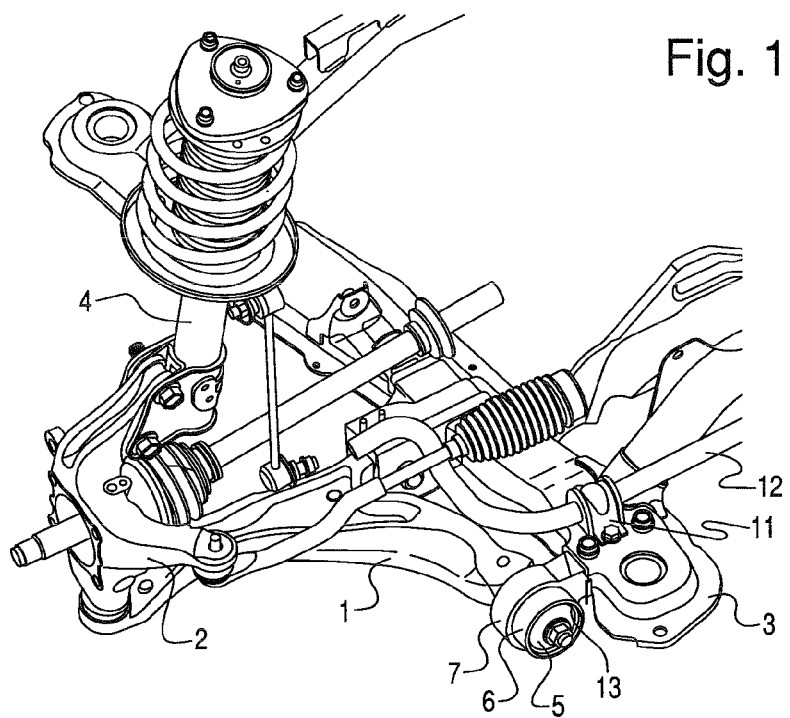
FIG. 1 is a perspective view of a vehicle suspension system employing a lower control arm and fastening structures made in accordance with principles of the disclosed subject matter.

Referring to the drawing figures, like reference numerals designate identical or corresponding elements throughout the several figures.

FIG. 1 shows a perspective view of a vehicle suspension system employing a lower control arm 1 and fastening structures made in accordance with the principles of the disclosed subject matter. The vehicle suspension system can include a wheel mount 2 that is connected to the vehicle frame 3 via a lower control arm 1 and an upper link assembly, such as a strut 4. The wheel mount 2 can be formed as a knuckle that is configured to hold a drive axle therein.

Figure 2A:
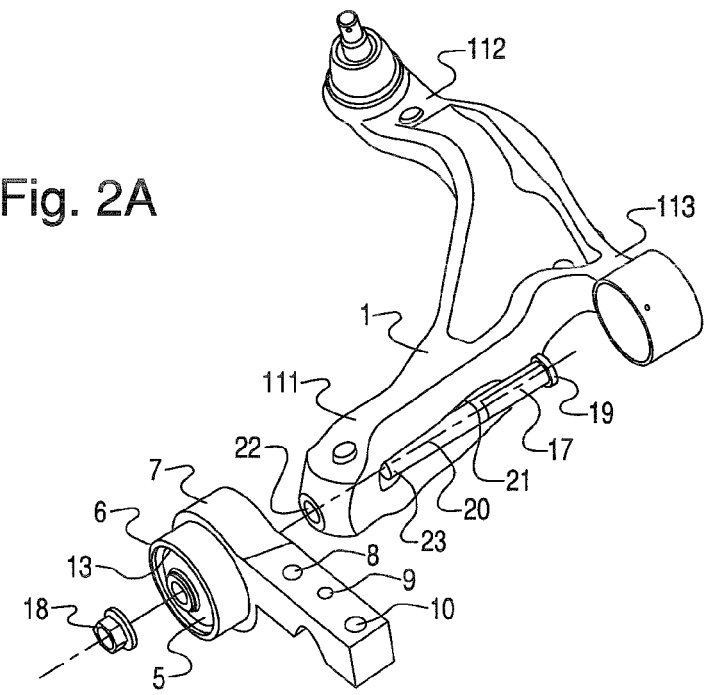
FIGS. 2A and 2B are detailed exploded perspective views of the lower control arm with fastening structures as shown in FIG. 1.

The control arm 1 can include a first distal extension portion 111 and a second distal extension portion 112 (as shown in FIG. 2A). The first and second distal extension portions 111 and 112 are joined together by an intermediary portion 113 to form a generally L-shaped control arm structure. The intermediary portion 113 can be configured for attachment to the vehicle frame 3 by, for example, an integral bearing and bushing into which a connective structure extending from the vehicle frame 3 can be attached. The first distal extension portion 111 can also be configured for attachment to the vehicle frame 3, as described in more detail below, such that the control arm 1 can rotate about a longitudinal axis of the first distal extension portion 111 and the central axis of the bearing/bushing of the intermediary portion 113. The second distal extension portion 112 can extend from the intermediary portion 113 and include attachment structure for attaching to the wheel mount structure 2 of the vehicle. The first distal extension portion 111 and a second distal extension portion 112 can be configured to extend continuously from the intermediary portion 113 in such a manner as to form a generally L-shaped control arm structure.

The first distal extension portion 111 of the control arm 1 can be attached to the vehicle frame 3 via a fastening rod 17 that connects to a bushing 5 located within a bearing opening 6. The bushing 5 and bearing 13 can both reside within an open end of a multi-mount suspension bracket 7 that attaches directly to the vehicle frame 3. The bearing 13 and bushing 5 of the multi-mount suspension bracket 7 are located outside and adjacent a first extension portion 111 of the lower control arm 1, and the vehicle frame 3 is often generally parallel to the first extension portion 111 of the lower control arm 1 along the longitudinal axis of the vehicle. However, this specific relationship between the first extension portion 111 and the vehicle frame 3 is dependent on the type of vehicle and vehicle frame being used, and can vary accordingly.

The fastening rod 17 can have a distal end that includes a fastening structure formed, for example, as a threaded end portion 23. A proximal end of the fastening rod 17 can include a stopping structure 19 that locks the fastening rod 17 to the control arm 1 and prevents the fastening rod 17 from passing totally through the control arm housing 21 and through-hole 22 when assembled. The fastening rod can be inserted into the control arm housing 21 by press-fitting or sliding the fastening rod therein. If necessary, a fitting sleeve or other structure can be provided to ensure a snug fit between the fastening rod 17 and the control arm housing 21.

The multi-mount suspension bracket 7 can include a plurality of openings in which fasteners may be permanently or removably inserted for connecting the multi-mount suspension bracket 7 to the vehicle frame 3. One or more of the fasteners can optionally pass through a removably mounted stabilizer bar clamp bracket 11 and also pass through one or more of the multi-mount suspension bracket openings to secure a stabilizer bar 12 to the vehicle frame 3.

Figure 2B:
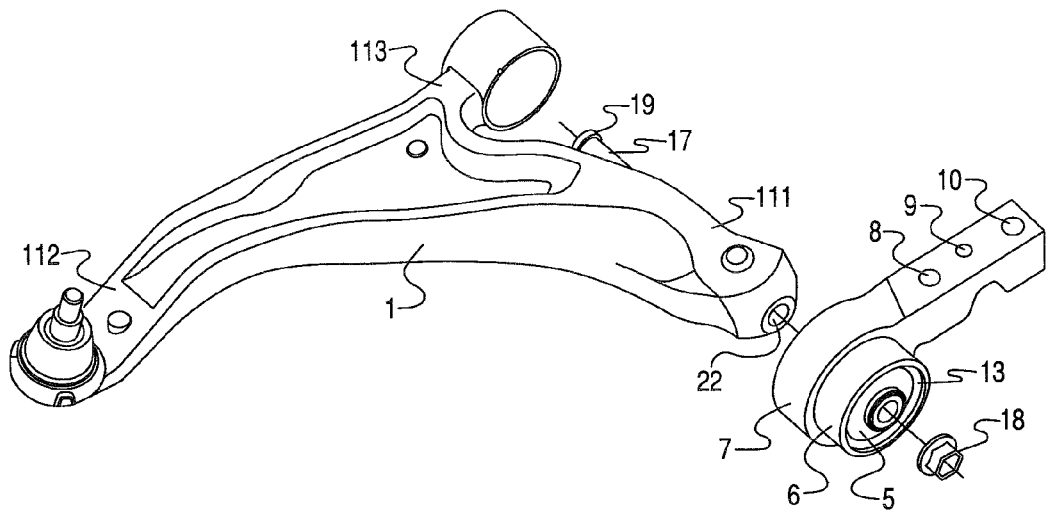

FIGS. 2A and 2B show an exploded view of a multi-mount suspension bracket 7 and its connection to a lower control arm 1 through a bushing 5. The multi-mount suspension bracket 7 can include a first opening 8, a second opening 9, and a third opening 10 which are all substantially parallel to each other. Each of the first, second, and third openings 8, 9, 10 can be tapped or untapped, depending on the desired operation/need. The first opening 8 and third opening 10 can be formed as through-holes for connection to the vehicle frame 3 via a suitable fastener, such as a bolt. The second opening 9 is shown as formed with a tapped hole for connection to a stabilizer bar clamp bracket 11. A fastening rod 17 is slideably mounted through a lower control arm housing 21 that is formed as a lower control arm through-hole 22 in this example. The fastening rod 17 can have a threaded end 23 which passes through the bushing 5 located in the open end of the multi-mount suspension bracket 7. A fastening rod stopping structure 19 can be provided on a distal portion of the fastening rod 17 such that it is located opposite a proximal portion of the fastening rod 17 that includes the fastening bolt threaded end 23. The fastening rod stopping structure 19 can have a diameter greater than the diameter of the fastening rod shaft 20 and can act as a stopping means to prevent the fastening rod 17 from being pulled through the control arm housing 21. The fastening bolt threaded end 23 protrudes from the end of the first distal portion 111 of the lower control arm 1. A fastening nut 18 or other attachment structure can be attached to the protruding fastening rod threaded end 23 that emerges from the bushing 5 to fixedly secure the bushing 5 to the lower control arm 1.

Figure 3A:
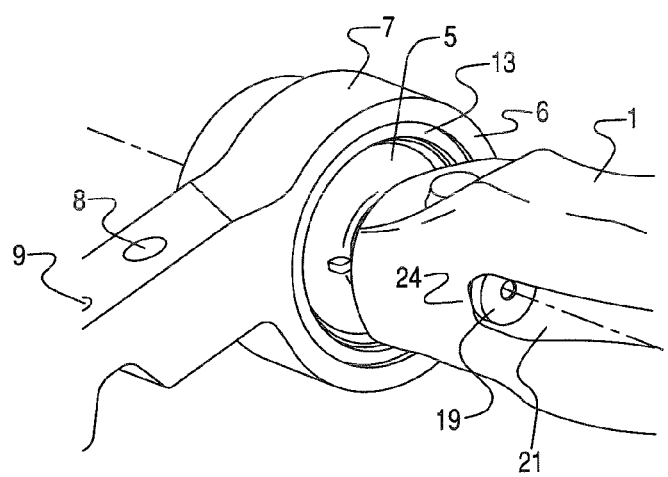
FIGS. 3A and 3B are detailed perspective views of the lower control arm with fastening structures as shown in FIG. 1.

FIG. 3A is a detailed perspective view of the control arm 1 attached to bushing 5. This perspective view shows the fastening rod stopping structure 19 secured in the control arm housing 21. The fastening rod stopping structure 19 rests against the control arm housing inner end 24 to secure the fastening rod 17 from movement along its longitudinal axis. The fastening rod threaded end 23 protrudes through the lower control arm through-hole 22 and into bushing 5 for attachment via a fastening nut 18. When assembled, the bushing 5 is located outside the control arm 1 and control arm housing 21 and at an end of the first distal portion 111 of the control arm 1. The multi-mount suspension bracket 7 is fastened about the bushing 5 to attach the bushing to the vehicle frame 3.

Figure 3B:
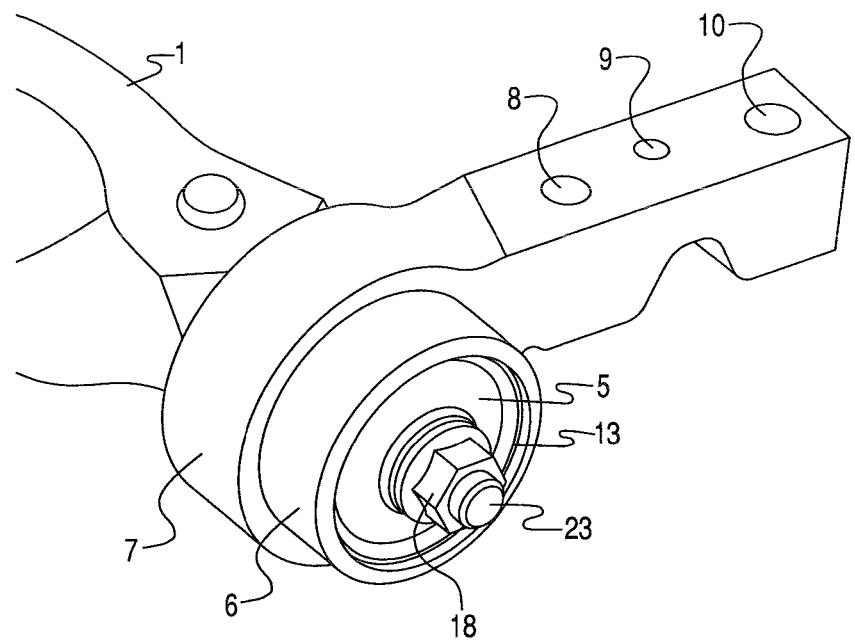

FIG. 3B is a detailed perspective view which is 180° rotated with respect to the FIG. 3A perspective view. This view shows the bushing 5 secured to the lower control arm 1 via the fastening nut 18 that is attached to the fastening rod threaded end 23.

Figure 4:
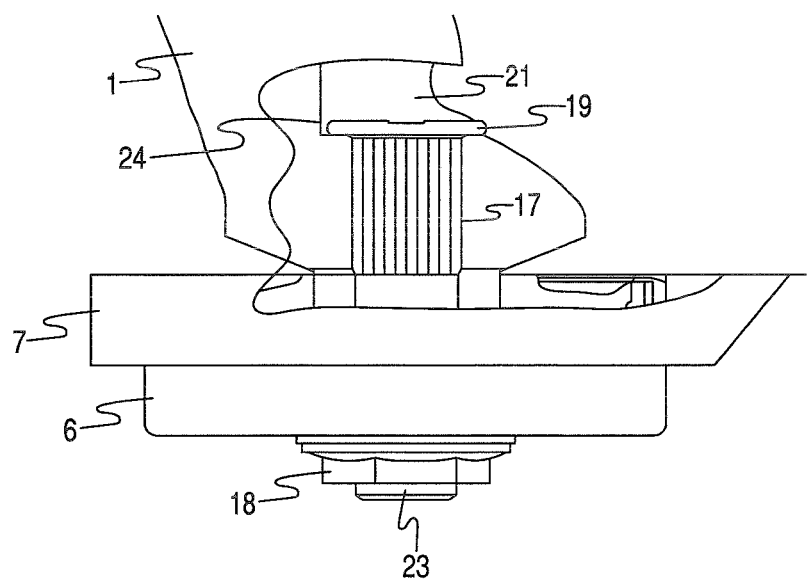
FIG. 4 is a partial sectional view of the lower control arm with fastening structures of FIG. 1.
Figure 5:
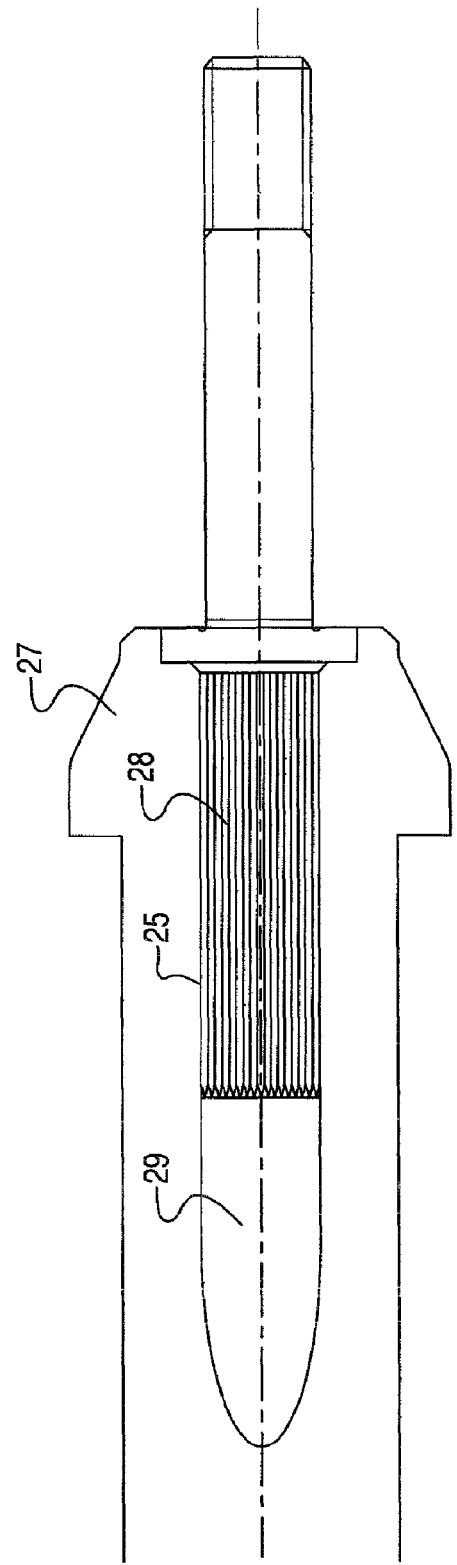
FIG. 5 is a cross-sectional view of a conventional art attachment structure.

FIG. 4 shows a partial sectional view of the fastening rod 17 connection arrangement with the bushing 5, bearing 13 and lower control arm 1. The fastening rod 17 is located in the control arm housing 21 and a fastening nut 18 can be used to secure the fastening bolt threaded end 23 that passes through the multi-mount suspension bracket 7 to the bushing 5 and bearing 13. This sectional view also shows the fastening rod stopping structure 19 resting against the control arm housing inner end 24 where the fastening rod stopping structure 19 has a greater diameter than that of the fastening rod shaft 20 located in the control arm housing 21.

During assembly, the fastening rod 17 can be inserted into the control arm housing 21 from the rear of the lower control arm 1 (from a location closer to the intermediate portion 113 of the control arm 1) and then pushed towards the first distal portion 111 of the control arm 1. Subsequently, the fastening rod 17 and the bushing are connected together by inserting the fastening rod 17 into the bushing 5, e.g., by either pushing the fastening rod 17 into the bushing 5 or pushing the bushing 5 onto the fastening rod 17. Thus, the fastening bolt threaded end 23 protrudes through the lower control arm through-hole 22 and the bushing 5. A fastening nut 18, such as a lock nut or the like, can then be tightened onto the fastening bolt threaded end 23, which secures the bushing 5 to the lower control arm 1. Further, securing the fastening nut 18 to the fastening bolt threaded end 23 causes the fastening rod stopping structure 19 to lodge against the control arm cavity inner end 24, further securing the bushing 5 to the lower control arm 1. The fact that the fastening rod stopping structure 19 can be directly or indirectly lodged against the control arm cavity inner end 24 prevents the fastening rod 17 from being pulled through the lower control arm through-hole 22 and the bushing 5. Thus, this exemplary construction affords greater degrees of safety and serviceability for a vehicle suspension system.

Various and different materials and configurations are contemplated for use with the vehicle suspension system and method described herein. For example, the fastening rod 17 can be fabricated from various metals, metal alloys, composite materials, or the like, depending upon the particular application and relative strength required for the fastening rod 17. The fastening nut 18 can also be similarly fabricated from metals such as steel, steel alloys, aluminum, other metals, and composite materials, although other materials may also be used. Furthermore, the control arm 1 can be made from a lightweight metal (as compared to the fastening rod 17) such as aluminum, aluminum alloys, steel, steel alloys, composite materials and resins, etc.

While certain embodiments of the invention are described above, it should be understood that the invention can be embodied and configured in many different ways without departing from the spirit and scope of the invention. For example, some or all of the separate attachment structures can be replaced with welds for simultaneous attachment between various structures, such as between the vehicle frame and mount brackets, etc.

The vehicle suspension system can be any type of suspension system in which a bushing can be mounted to a control arm, and is not limited to a four bar or two bar vehicle suspension system.

It should be noted that the control arm 1 is shown as an L-shaped control arm. However, the principles of the disclosed subject matter could be incorporated into differently shaped control arms. In addition, although the bushing 5 is depicted as a typical elastic bushing surrounded by a bearing 13 in the figures, there are many other various connection structures that could be used as the bushing 5 without departing from the spirit of the disclosed subject matter. For example, the bushing 5 can be a fluid coupling device, a spring coupling device, or a ball bearing coupling device.

With regard to the fastening rod 17, the rod 17 can be formed as a bolt, a spline, a bar, a rivet, a stud or other structure that can perform the functions as described above with respect to the fastening rod 17. In addition, although the housing 21 in which the fastening rod 17 is inserted is depicted as a cavity in the first distal portion 111 of the control arm 1, the housing 21 can take on many other various forms. For example, the housing 21 can be formed separately from the control arm 1 and attached thereto by a fastening structure. In addition, the housing 21 can be formed by separate cylindrical or partially cylindrical structures either formed in or by the control arm 1. The cavity or opening in which the fastening rod 17 resides is not required to be totally encapsulating and may be formed as a partial through-hole or partial cavity that only partially encircles the fastening rod 17.

The fastening rod 17 includes a stopping structure 19 that is formed as a lip in the appended figures. However, it is contemplated that the stopping structure 19 can be formed in various different ways. In particular, the stopping structure 19 can be a slight irregularity in the proximal end of the fastening rod 17 that allows the rod 17 to lock with respect to the control arm housing 21. In addition, a separate nut, a bolt head, a cotter pin, extension, crimpable portion, etc. can be provided as the stopping structure 19 to lock the rod 17 in the housing 21.

The fastening structure of the fastening rod 17 is depicted as a threaded portion 23. However, other fastening structures can be used without departing from the spirit of the disclosed subject matter. For example, a cotter pin, a weld, an adhesive, a rivet, a crimpable portion, etc., can be provided at the distal end of the fastening rod 17 to provide the fastening structure that allows the bushing 5 and multi-mount 7 to be secured to the control arm 1. Likewise, different structures are contemplated for use as the stopping structure located at the proximal end of the fastening rod, as described above. Furthermore, the longitudinal axis of the fastening rod 17 can be parallel with, coincident with, or substantially parallel with the longitudinal axis of the first distal extension portion 111 of the control arm.

While the invention has been described in detail with reference to exemplary embodiments thereof, it will be apparent to one skilled in the art that various changes can be made, and equivalents employed, without departing from the scope of the invention. Each of the aforementioned conventional are documents is incorporated by reference herein in its entirety.

What is claimed is:

1. A vehicle suspension mounting structure, comprising:
    a control arm including a main portion, a vehicle frame connection end portion that extends from the main portion, and a wheel mount connection end portion that extends from the main portion, the vehicle frame connection end portion having a longitudinal axis and a housing that extends along the longitudinal axis;
    a bushing located adjacent the vehicle frame connection end portion of the control arm and substantially outside of the housing of the control arm, the bushing including a mount structure configured to be connected to a vehicle frame; and
    a fastening rod having a stopping structure at a first end and a fastening structure at an opposite end, wherein the fastening rod is located in the housing of the vehicle frame connection end portion of the control arm and extends into the bushing, and the stopping structure of the fastening rod is located proximally with respect to the control arm such that a portion of the control arm stops the stopping structure of the fastening rod from moving in an outward direction along the longitudinal axis of the vehicle frame connection end portion, and the fastening rod extends from the housing and into the bushing; and
    a connection structure secures the fastening structure at the opposite end of the fastening rod with the bushing, wherein the stopping structure includes a fastening rod lip formed at a tip of the first end of the fastening structure.

2. The vehicle suspension mounting structure according to claim 1, wherein the fastening structure is a threaded end of the fastening rod and the connection structure is a nut that is secured to the fastening structure of the fastening rod.

3. The vehicle suspension mounting structure according to claim 1, wherein the control arm is formed as a single continuous material, and the housing is formed as a cavity in the control arm.

4. The vehicle suspension mounting structure according to claim 1, wherein the control arm is constructed of at least one of a lightweight metal and a lightweight metal alloy, and the fastening rod is constructed of at least one of a metal and a metal alloy that has a greater density than the at least one of the lightweight metal and the lightweight metal alloy.

5. The vehicle suspension mounting structure according to claim 4, wherein the at least one of the lightweight metal and the lightweight metal alloy includes at least one of an aluminum, a cast iron, and an aluminum alloy, and wherein the at least one of the metal and the metal alloy includes at least one of a steel and a steel alloy.

6. The vehicle suspension mounting structure according to claim 1, wherein the fastening rod is constructed of a first material that is denser than a second material from which the control arm is constructed.

7. The vehicle suspension mounting structure according to claim 6, wherein the fastening rod material is selected from one of a steel and a steel alloy.

8. A vehicle suspension arm mounting arrangement comprising:
    a control arm that includes an extension that has a longitudinal axis and a rod housing;
    a bushing located adjacent the control arm and substantially outside of the rod housing; and
    a fastening rod having a longitudinal axis, a stopping structure located at a first portion of the fastening rod, and a connection structure located at a second portion of the fastening rod, the fastening rod connecting the control arm to the bushing, wherein
    the rod housing of the control arm extension is configured to receive the fastening rod such that the longitudinal axis of the fastening rod is substantially parallel with the longitudinal axis of the extension of the control arm, and
    the second portion of the fastening rod extends into the bushing and is connected to the bushing by the connection structure, and the stopping structure located at the first portion of the fastening rod is configured to prevent the first portion of the fastening rod from moving towards the bushing after assembly, wherein the stopping structure includes a fastening rod lip formed at a tip of the first end of the fastening structure.

9. The vehicle suspension arm mounting arrangement according to claim 8, wherein the control arm is an L-shaped structure defined by a first distal portion and a second distal portion both extending from an intermediary portion, and the fastening rod extends longitudinally from an end of the first distal portion of the L-shaped structure.

10. The vehicle suspension arm mounting arrangement according to claim 8, further comprising:
    a vehicle frame connected via the fastening rod and bushing to the first distal portion of the L-shaped control arm, and connected via a second connection part to the intermediary portion of the L-shaped control arm; and
    a wheel mount structure connected to the second distal portion of the L-shaped control arm.

11. The vehicle suspension arm mounting arrangement according to claim 8, wherein the fastening rod connection structure includes a plurality of threads connected to a nut, and the lip of the fastening rod is formed at the proximal portion of the fastening rod.

12. The vehicle suspension arm mounting arrangement according to claim 8, wherein the control arm is constructed of at least one of a lightweight metal and a lightweight metal alloy, and the fastening rod is constructed of at least one of a metal and a metal alloy that has a greater density than the lightweight metal or lightweight metal alloy.

13. The vehicle suspension arm mounting arrangement according to claim 12, wherein the at least one of the lightweight metal and the lightweight metal alloy includes at least one of an aluminum and an aluminum alloy, and the at least one of the metal and the metal alloy includes at least one of a steel and a steel alloy.

14. A method of connecting a vehicle control arm to a vehicle frame, comprising:
    providing,
        a control arm that includes a first extension portion having a longitudinal axis and a fastening rod housing, a fastening rod having a longitudinal axis, a stopping structure located on a first portion of the fastening rod, and a second portion opposed to the first portion along the longitudinal axis, a bushing, and a vehicle frame;

inserting the fastening rod into the fastening rod housing of the control arm and into the bushing such that the second portion of the fastening rod extends first into the fastening rod housing of the control arm and then extends into the bushing;

connecting the fastening rod to the bushing; and connecting the bushing to the vehicle frame.

15. The method of connecting a vehicle control arm to a vehicle frame of claim 14, wherein the longitudinal axis of the fastening rod is substantially parallel with the longitudinal axis of the first extension portion of the control arm, and a portion of the first extension portion is located along the longitudinal axis of the fastening rod and between the fastening rod and a central portion of the control arm.

16. The method of connecting a vehicle control arm to a vehicle frame of claim 14, wherein the second extension portion includes a second connection structure that has a longitudinal axis that is substantially coincident with the longitudinal axis of the fastening rod such that the control arm can rotate about both the longitudinal axis of the second connection structure and the longitudinal axis of the fastening rod with respect to a vehicle frame to which the control arm is connected, and inserting includes inserting the fastening rod along the longitudinal axis and away from the second connection structure.

17. The method of connecting a vehicle control arm to a vehicle frame of claim 14, wherein providing includes providing a connection structure in the form of threads on the fastening rod, and providing a nut configured for attachment to the threads of the fastener bolt, and connecting the fastening rod to the bushing includes threading the nut onto the threads of the fastening rod.

18. The method of connecting a vehicle control arm to a vehicle frame of claim 14, wherein the control arm includes a second extension portion, and an intermediary portion extending continuously between the first extension portion and the second extension portion, and inserting includes moving the fastening rod substantially parallel to the longitudinal axis of the first extension portion and generally away from the intermediary portion.

19. The method of connecting a vehicle control arm to a vehicle frame of claim 18, wherein the control arm is substantially L-shaped in configuration, with the first extension portion, second extension portion and the intermediary portion being continuous and forming the substantially L-shaped configuration.

* * * * *